J. ELLIOTT,

Assignor to himself, H. A. HOGEL, and R. A. KELLOND.

BOILER FURNACE.

No. 10,044. Reissued Feb. 28, 1882.

Witnesses:

F. E. Morey

Inventor

Per: James Elliott,

R. A. Kellond.

Attorney

N. PETERS. Photo-Lithographer, Washington, D. C.

UNITED STATES PATENT OFFICE.

JAMES ELLIOTT, OF MONTREAL, QUEBEC, CANADA, ASSIGNOR TO HIMSELF, HASCAL A. HOGEL, OF YONKERS, NEW YORK, AND ROBERT A. KELLOND, OF MONTREAL, QUEBEC, CANADA.

BOILER-FURNACE.

SPECIFICATION forming part of Reissued Letters Patent No. 10,044, dated February 28, 1882.

Original No. 248,925, dated November 1, 1881. Application for reissue filed November 23, 1881.

*To all whom it may concern:*

Be it known that I, JAMES ELLIOTT, of the city of Montreal, in the district of Montreal and Province of Quebec, Canada, have invented certain new and useful Improvements in Boiler-Furnaces; and I do hereby declare that the following is a full, clear, and exact description of the same.

The object of my invention is to consume the smoke arising from the fire in steam-boilers, and also to save fuel in their working. I accomplish this end by blowing from a point or points above the fire jets of mingled steam, air, and smoke or gases, said smoke and gases being drawn back after they escape from the fuel and thrown over the grate, the necessary suction being produced by the discharge of steam brought from the boiler and directed through nozzles, which also serve as conductors for the air and waste smoke and gases mentioned.

My invention also embodies an arrangement of flues whereby air admitted thereto from outside the furnace may be heated and introduced under the grate-bars, and further covers a hollow furnace-door to which air is admitted, and from which said air is discharged over the fire by means of and mingled with jets of steam proceeding from a steam-pipe located therein and connected with the boiler. For more complete comprehension, however, of my invention reference must be had to the annexed drawings, in which similar letters of reference indicate like parts, and where—

Figure 1:
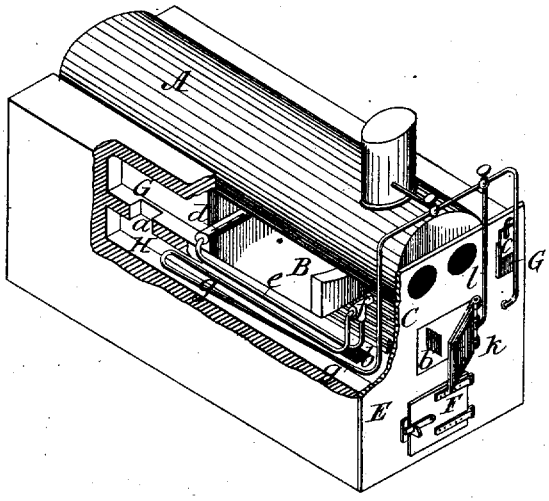
Figure 2:
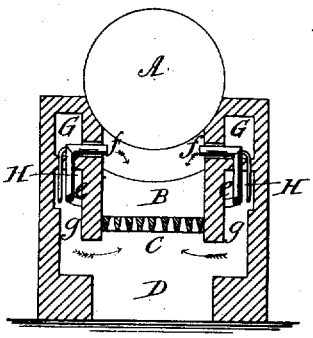
Figure 3:
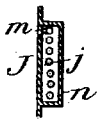
Figure 4:
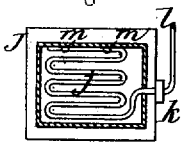
Figure 5:
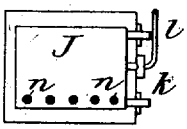

Figure 1 is an isometrical sectional view of a boiler-furnace embodying my improvements; Fig. 2, a transverse section taken through the fire-box; Figs. 3, 4, and 5, views of my improved furnace-door, and Fig. 6 section of self-closing tap.

A represents the boiler; B, the bridge at back of furnace; C, the grate-bars; D, the ash-pit; E, end plate of boiler-seat, and F the ash-pit door, all of which parts are constructed and arranged in the ordinary manner.

*d* shows a perforated pipe placed in the passage taken by the smoke and gases after they leave the fire, and *e e* are pipes connected therewith and extending toward the front of the furnace, inside of the brick-work, to a point or points at the sides of the fire-chamber, where they terminate in or connect with nozzles *f f*, which nozzles project toward the center of the fire through small spaces left in the brick-work.

*g g* indicate steam-pipes forming connection with the boiler and extending inside the brick-work (for superheating or drying purposes) for some distance toward the back of same, being thence returned, so as to form a junction with the pipes *e e* at the nozzles *f f*.

G G are flues, or rather air-passages, built in the brick-work of the boiler-seating, one on each side, toward the top and close alongside of the fire, extending toward the back end of the boiler, where they are connected by the outlets or openings *a a* with two similar return-flues or air-passages, H H, extending toward the front end, and having their outlets at *b b* underneath the grate-bars. The outer ends of the passages G G are protected by adjustable sliding doors or dampers *c c*, mounted on the front plate of the boiler-seat E, for the proper regulation of the amount of air admitted for the hot-air draft. It will thus be seen that the suction produced at the nozzles *f f* by the discharge through them of steam from the pipes *g g* will have the effect of drawing air and waste smoke and gases into the perforated pipe *d* and throwing same over the fire simultaneously with the steam which effects said suction, by this means, as will be understood by those skilled in the art, insuring the consumption of the smoke and consequent saving of fuel.

Figure 6:
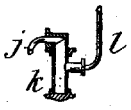

Another part of my improvements consists in the employment of a hollow steam-heated furnace-door, J, which may be constructed as shown in Figs. 4, 5, and 6, and used either in conjunction with or independently of the apparatus already described. It is formed of iron plates with sufficient space between to admit of an internal steam-pipe, *j*, made into a coil, so as to expose the greatest possible surface to the action of the heat from the furnace. It is connected at the hinge of the door by a self-closing tap or cock, K, to a pipe, *l*, from the boiler, so that when the furnace-door J is closed steam is admitted to the coil *j*, and when partially or fully opened is cut off. The upper end of the coil *j* is provided with openings *m m*, admitting the steam, after being superheated, into the furnace over the fire. The exterior shell of the furnace-door J, toward its lower side, is perforated with a number of holes, *n n*, admitting the external air, which is thus highly heated both by the furnace and steam-coil *j*, and introduced, in combination with the jets of superheated steam, through the openings *m m* into the furnace over the fire, thus aiding the saving of fuel and consumption of smoke effected by the other parts of my apparatus, or, as may happen in some cases, supplying all the necessary requirements.

It will be seen that the flues H H serve a very useful purpose in protecting the pipes *e* and *g* from the burning action of the fire, besides effecting their primary object of holding said pipes in such a position that the smoke in the pipes *e* and the steam passing through the pipes *g* may both become highly heated before being discharged into the fire-chamber.

My object in introducing flues G G and H H into my apparatus is to combine in the most feasible way means for covering and carrying the pipes *e* and *g*, as above mentioned, and at the same time heating the cold air brought in from the front of the furnace to a high temperature before discharging same under the grate-bars, and I lay no claim to any other arrangement.

I do not limit the scope of my improvements to the precise details herein described, and shown in the drawings, so long as the peculiar character of any part of my invention is retained.

I am aware that unconsumed smoke and gases have been drawn into a chamber located near the bridge-wall, there mixed with air and exhausted or drawn into the ash-pit, or underneath the grate, by means of steam-jets. I am also aware that steam and air by themselves, and mixed together, have been blown over the fire from the front of a furnace in jets for the purpose of consuming smoke; but these devices have been found impracticable and of no great service. Now, in my invention I embody three well-known principles, neither of which I claim separately—viz., the drawing back of smoke and gases, the admission of air, and blowing of steam in the form of jets into the fire-chamber above the grate; and, further, by the location of my jets on either side of the fire I am enabled to control or cover a larger grate-surface than can be done by the old method of blowing from the front, as it will be seen that each side jet need only blow over one-half the width of the fire.

The saving of fuel is effected, as will be readily seen, by burning the smoke and gases which at present escape to the outer air, and also by the action of the jets upon the fire, which serve the purpose of keeping the same clear by blowing off the scale from the coal, (where such is used,) burning same, and thus keeping the flues clear, preventing clinkers from forming, and otherwise promoting the proper and economical combustion of whatever fuel is used for the generation of steam.

What I claim, and desire to secure by Letters Patent, is as follows:

1. In a boiler-furnace, the combination of the grate, the hollow side walls, side pipes for conveying the products of combustion, and steam-pipes communicating with such side pipes at or near the discharge-orifices, whereby the products of combustion are drawn back and discharged into the fire.

2. In a boiler-furnace, the grate and fire-place and the hollow side walls, in combination with smoke and steam pipes arranged, substantially as described, within such hollow side walls.

3. In a furnace for generating steam or other purposes, a flue or passage made in two divisions, one above the other, and connected by passages near the back, the upper flue or division receiving cold air from outside the furnace, and the lower flue discharging same in a heated condition underneath the grate, in combination with and serving to hold pipes conducting smoke and steam to a point over the grate, substantially as described.

4. A hollow door for a furnace, inclosing a coil connected with a steam-supply, said door having openings for the admission of air, and an exit-opening through which the air and steam are ejected into the furnace.

5. A hollow furnace-door inclosing a steam-coil and having inlet-openings through which mingled air and steam are injected into the fire, and self-regulating steam-supply cock, substantially as described.

JAMES ELLIOTT.

Witnesses:
R. A. KELLOND,
J. A. RENNIE.